United States Patent Office 2,934,442
Patented Apr. 26, 1960

2,934,442

METHOD OF MAKING CERAMIC DIELECTRIC MATERIAL

John M. Herbert, Horton, England, assignor to The Plessey Company Limited, Ilford, England, a British company No Drawing. Application July 23, 1956
Serial No. 599,662

1 Claim. (Cl. 106—39)

This invention relates to dielectric materials containing barium titanate.

It is well known that a dispersion of metal particles in an insulating medium acts as a dielectric with an apparent dielectric constant several times that of the insulating medium. Similarly it is possible to make a dielectric from a mass of semi-conducting particles separated from each other by insulating barriers.

The application of these methods of enhancing the dielectric constant of barium titanate has not been practicable up to now. Normally barium titanate must be fired in air to a temperature between 1250 and 1450° C. to give an insulating, dense ceramic. Under these conditions all base metals are oxidised and in the oxidised state react with barium titanate to form substantially insulating materials. Palladium and platinum remain metallic but their cost prevents their large scale use. Silver and gold melt and the molten particles tend to conglomerate and flow out of the mass.

Barium titanate normally gives a black conducting body if fired in hydrogen and it might be possible by carefully oxidising the exterior of these particles and simultaneously in some way cementing them together with oxidised (and, therefore, insulating) barium titanate to make an artificial dielectric; but such a process has been found very difficult to control in practice.

In my co-pending U.S. application Ser. No. 542,478, filed September 13, 1955, there is described a dielectric material which consists essentially of $BaTiO_3$ and $MnO$ in quantities corresponding to the formula $2BaTiO_3.MnO$. This dielectric material is produced by firing a mixture of $BaCO_3$, $TiO_3$ and $MnO$ in powder form to produce a sintered dielectric material having a composition corresponding to the above stated formula $2BaTiO_3.MnO$. The material contains free manganous oxide and a compound closely resembling barium titanate and which is believed to be a solution of manganous oxide in barium titanate. When the above prepared dielectric material is fired in a reducing atmosphere, such as hydrogen, an insulating body is obtained which has a high dielectric constant.

In my co-pending U.S. application No. 582,945, filed May 7, 1956, it is further explained that the $BaTiO_3$ and $MnO$ can be in such proportions as to correspond to the formula $4BaTiO_3.MnO$ or $6BaTiO_3.MnO$ as alternatives to the proportions specified in co-pending U.S. application No. 542,478. My co-pending U.S. specification Ser. No. 582,945 also indicates that it is possible to substitute other elements for up to 50 mol percent of the barium and titanium. It is stated that substitutions of more than a few percent result in a material of reduced permittivity but it may have a lower temperature co-efficient of permittivity. Elements which may be substituted for barium are magnesium, beryllium, calcium, strontium, yttrium and lanthanum. For titanium there may be substituted zirconium, hafnium, cerium, thorium, tin and tantalum. Magnesium may be used in part instead of manganese, substitution of up to 75 mol percent being possible without appreciably affecting the dielectric properties.

The above described dielectric material (or the precursors therefor) is used in the process of the present invention.

In this specification the phrase "ceramic dielectric material of the kind specified" is used to designate the ceramic dielectric material described in my co-pending U.S. patent applications Ser. Nos. 542,478 and 582,945.

According to the present invention there is provided a process for the production of a ceramic dielectric material which comprises the steps of (a) firing in air for 2 hours at 1100° C. a mixture of 130 parts by weight of barium carbonate, 52.6 parts by weight of titanium dioxide and 19 parts by weight of manganous carbonate to produce a sintered interdiffused mixture of the constituent materials, (b) grinding the sintered mixture to a particle size of 1 to 10 microns, (c) mixing 15 parts by weight of the ground sintered mixture with 3 parts by weight of carbonyl iron powder having a particle size of 3 to 8 microns, (d) adding a binder to the mixture of the carbonyl iron powder and ground sintered mixture and compacting the composition obtained to the desired shape, and (e) firing the same in hydrogen to 1200° C., the firing being effected in about four hours from room temperature.

The substance which is a conductor or yields a conductor on firing in hydrogen may be a metal or a metallic compound, e.g. an oxide, reducible to the metal by firing in a reducing atmosphere. Alternatively it may be a barium titanate, modified or unmodified by additions, which becomes conductive on firing in a reducing atmosphere, or percursors for such a form of barium titanate.

The invention thus affords a dielectric material comprising a dispersion of discrete particles of a conductive material in an insulating medium consisting of a ceramic dielectric material of the kind specified.

The following examples are given by way of illustration and without limitation.

*Example 1*

From 5 to 25 parts by weight of ferric oxide are mixed with from 95 to 75 parts of a barium titanate of the kind specified (or its precursors) which yields an insulator on firing for two hours in hydrogen, and fired from 6 to 16 hours to 1100° C. in air to give a sintered, interdiffused mixture of the constituent oxides. This mixture is then ground to a particle size of 1 to 10 microns and pressed or moulded under a moulding pressure of 5 tons per square inch to the required shape of dielectric. It is then fired in hydrogen to 1200° C. for 1 hour when it sinters to a ceramic material containing iron particles which are in the form of a finely divided dispersion. The cooling from 1200° C. is in two stages, the first taking between 10 and 30 minutes to cool from 1200° C. to 1000° C., and the second stage taking 12 hours to cool from 1000° C. to 20° C. An electrode material, for example iron oxide, can be applied to suitable areas of the body before firing, in which case a substantially complete condenser is obtained in one furnacing operation, or silver may be evaporated on to the fired body to form electrodes in the required area.

*Example 2*

A form of barium titanate of the kind specified which will fire in hydrogen to form an insulator is mixed with an unmodified form which will fire in hydrogen to form a conductor and the mixture is fired in hydrogen. In this case the mixture that is eventually to be conducting is fired to 1300° C. in hydrogen for 2 hours. The sintered, partially reduced product is ground to relatively coarse particles and sieved through a 200 mesh screen; the fraction passing through is rejected. The coarse particles are such that 80% by weight of the powdered material should pass through a 100 I.M.M. screen and all through a 30

I.M.M. screen. 50 to 80 parts of this said product are mixed with 50 to 20 parts of a non-reducing composition comprising a barium titanate modified by the addition of manganese oxide which has a smaller particle size, all less than 5 microns, and the mixture is fired in hydrogen to 1200° C. for 1 hour. The cooling of the fired mixture is effected in two stages, the first taking between 10 and 30 minutes to cool from 1200° C. to 1000° C. and the second taking between 4 and 12 hours to cool from 1000° C. to 20° C. The density of the resulting ceramic is 5.5 to 5.8 grams per cubic centimetres. The moulding pressure is five tons per square inch. As before, electrodes can be applied before or after final furnacing.

*Example 3*

A ceramic dielectric material of the kind specified is made by firing together 130 parts by weight of barium carbonate, 52.6 parts of titanium dioxide and 19 parts of manganese carbonate. The barium carbonate and manganese carbonate are precipitated materials dried at low temperatures with particle sizes ranging mainly between 0.5 and 5$\mu$. The titanium dioxide is a pigment powder of particle size mainly 0.1 to 1$\mu$ and with the anatase crystal structure. The materials must be well mixed and should be fired for 2 hours at 1100° C. in air. After firing the material is ground to a particle size of 1 to 10 microns and 15 parts by weight are mixed with 3 parts by weight of carbonyl iron powder having a particle size of 3 to 8 microns. A binder is added to the mixture which is then compacted at 10 tons per square inch into the form of a pellet or otherwise formed into a desired shape. A suitable binder comprises a 30% solution of polybutylmethacrylate in acetone. The shapes obtained are fired and the shapes having a density of 5.8 to 6.0 grammes per square centimetre and being constituted by metallic iron in barium manganese titanate. The carbon formed from the decomposition of any organic matter is removed by introducing water vapour when the temperature reaches 1000° C. This may be done conveniently by passing the hydrogen through water heated to 85° C. The final sintering in hydrogen is carried out at 1250° C. for 1 hour. The cooling of the fired ceramic takes between 10 and 30 minutes to cool from 1250° C. to 1000° C., and between 4 and 12 hours to cool from 1000° C. to 20° C. After cooling in hydrogen, electrodes may be applied to said shapes by evaporating silver in a vacuum on to suitable areas.

The effect of the metal content is to increase the dielectric constant relative to that of the dielectric in the absence of metal by a factor lying between 1.5 and 6. The resistivity is reduced by the same factor whilst the power factor is unaffected. In the case of Example 1, materials containing 9.6 and 11.2 percent by volume of metal content gave permittivities at room temperature of 3630 and 9800 with power factors of 2 and 4.5 percent. The resistivities being $3 \times 10^{10}$ and $1 \times 10^{10}$ ohms per centimetre respectively. The results obtainable in the case of Examples 2 and 3 are similar.

While condensers suitable for any electrical purpose may be prepared from the dielectric material of the invention, it is particularly adapted for types usuable in the suppression of electromagnetic radiation from machinery or devices which produce electric sparks during their normal operation.

What is claimed is:

A process for the production of a ceramic dielectric material which comprises the steps of (*a*) firing in air for 2 hours at 1100° C. a mixture of 130 parts by weight of barium carbonate, 52.6 parts by weight of titanium dioxide and 19 parts by weight of manganous carbonate to produce a sintered inter-diffused mixture of the constituent materials, (*b*) grinding the sintered mixture to a particle size of 1 to 10 microns, (*c*) mixing 15 parts by weight of the ground sintered mixture with 3 parts by weight of carbonyl iron powder having a particle size of 3 to 8 microns, (*d*) adding a binder to the mixture of the carbonyl iron powder and ground sintered mixture and compacting the composition obtained to the desired shape, and (*e*) firing the same in hydrogen to 1200° C., the firing being effected in about four hours from room temperature.

References Cited in the file of this patent

UNITED STATES PATENTS

| | | |
|---|---|---|
| 2,529,719 | Wentworth | Nov. 14, 1950 |
| 2,695,240 | Oshry | Nov. 23, 1954 |
| 2,750,657 | Herbert et al. | June 19, 1956 |

FOREIGN PATENTS

| | | |
|---|---|---|
| 460,764 | Canada | Nov. 1, 1949 |